United States Patent [19]

Fleischer et al.

[11] 4,330,467
[45] May 18, 1982

[54] DISUBSTITUTED ISOTHIAZOLE AZO DYES CONTAINING TETRAHYDROQUINOLINE TYPE COUPLERS

[75] Inventors: Jean C. Fleischer; Ronald J. Maner; Gary T. Clark, all of Kingsport, Tenn.

[73] Assignee: Eastman Kodak Company, Rochester, N.Y.

[21] Appl. No.: 126,631

[22] Filed: Mar. 3, 1980

[51] Int. Cl.³ ............... C07C 107/04; C09B 29/039; C09B 29/36; C09B 29/44
[52] U.S. Cl. .................................. 260/155; 260/154
[58] Field of Search ............................. 260/155, 154

[56] References Cited

U.S. PATENT DOCUMENTS

| | | | |
|---|---|---|---|
| 2,805,218 | 9/1957 | Towne et al. | 260/152 |
| 2,827,450 | 3/1958 | Towne et al. | 260/152 |
| 2,839,523 | 6/1958 | Towne et al. | 260/155 |
| 3,143,540 | 8/1964 | Meen et al. | 260/155 |
| 4,255,326 | 3/1981 | Giles et al. | 260/155 X |
| 4,271,071 | 6/1981 | Clark | 260/158 X |

*Primary Examiner*—Charles F. Warren

*Attorney, Agent, or Firm*—Donald W. Spurrell; Daniel B. Reece, III

[57] ABSTRACT

Disclosed are novel azo dyes containing an isothiazole diazo moiety which may be substituted, and a tetrahydroquinoline coupler which also may be substituted. The dyes produce red to violet shades on, for example, hydrophobic textile fiber including polyesters, polyamides, and cellulose esters and have excellent properties including lightfastness, washfastness and resistance to sublimation, and dye at unusually low energy levels. The dyes have the general formula

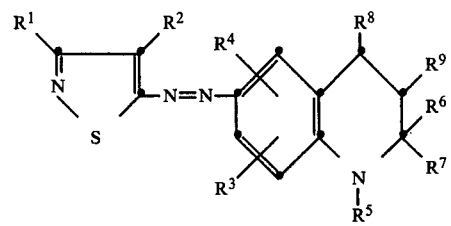

wherein the various substituents, $R^1$ through $R^9$, are selected from a wide variety of groups such as alkyl, —CN, halogen, alkoxy, and the like.

5 Claims, No Drawings

DISUBSTITUTED ISOTHIAZOLE AZO DYES CONTAINING TETRAHYDROQUINOLINE TYPE COUPLERS

This invention relates to novel azo dyes containing an azo isothiazole moiety which may be substituted, and a tetrahydroquinoline coupler which also may be substituted. The dyes produce red to violet shades on hydrophobic textile fiber including polyesters, polyamides, and cellulose esters and show improvements in one or more of such properties as fastness to light, wash, ozone, gas such as oxides of nitrogen, perspiration, crock, sublimation, dyeability at unusually low energy levels to deep shades and exhibit excellent build, pH stability, bloom resistance, leveling, migration, dye bath exhaustion, dye transfer, and the like.

The dyes of this invention have the following general formula:

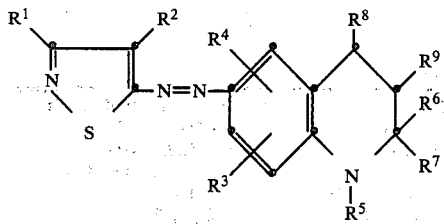

wherein $R^1$ and $R^2$ are each selected from cyano, bromo, hydrogen, chloro, formyl, lower alkoxycarbonyl, lower alkyl, lower alkylsulfonyl, thiocyanato, carbamoyl, lower alkylcarbamoyl and lower alkanoyl;

$R^3$ and $R^4$ are each selected from hydrogen, fluorine, chlorine, bromine, lower alkyl, cycloalkyl, lower alkoxy, phenoxy, lower alkylthio, arylthio, and radicals having the formula $-NH-X-R^{10}$ in which X is $-CO-$, $-COO-$, or $-SO_2-$ and $R^{10}$ is selected from lower alkyl and lower alkyl substituted with halogen, hydroxy, phenoxy, aryl, cyano, cycloalkyl, lower alkylsulfonyl, lower alkylthio, lower alkanoyloxy, and lower alkoxy, and when X is $-CO-$, $R^{10}$ also can be hydrogen, amino, lower alkylamino, lower alkylcarbamoyl, lower dialkylamino, arylamino, aryl, or furyl;

$R^5$ is selected from hydrogen; cycloalkyl; cycloalkyl substituted with one or two groups selected from lower alkyl, $-OH$, lower alkoxy, halogen and hydroxy substituted lower alkyl; phenyl or phenyl substituted with lower alkyl, lower alkoxy, halogen, lower alkanoylamino, cyano or lower alkoxycarbonyl; straight or branched lower alkenyl; straight or branched alkyl of 1–8 carbons and such alkyl substituted with the following: hydroxy; halogen; cyano; succinimido; glutarimido; phthalimido; 2-pyrrolidono; cyclohexyl; phenyl or phenyl substituted with lower alkyl, lower alkoxy, halogen, lower alkanoylamino, cyano or lower alkoxycarbonyl; lower alkanoylamino; sulfamoyl; lower alkylsulfamoyl; vinylsulfonyl; acrylamido; phthalimidinyl; benzoylsulfonicimidyl; lower alkylsulfonamido; phenylsulfonamido; lower alkoxycarbonylamino; lower alkylcarbamoyloxy; lower alkoxycarbonyl; lower alkoxycarbonyloxy; groups of the formula

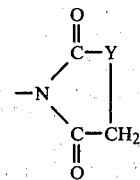

wherein Y is $-NH-$, $-NH-$lower alkylene, $-O-$, $-S-$, or $-CH_2O-$; $-S-R^{11}$ wherein $R^{11}$ is lower alkyl, phenyl, phenyl substituted with halogen, lower alkyl, lower alkoxy, lower alkanoylamino, cyano, or lower alkoxycarbonyl, pyridyl, pyrimidinyl, benzoxazolyl, benzimidazolyl, benzothiazolyl, triazolyl, or

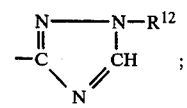

$-SO_2R^{10}$; $-COOR^{10}$; $-OXR^{10}$; $-NH-X-R^{10}$; $-X-R^{10}$; $-OCO-R^{10}$; $-CONR^{12}R^{12}$; $-SO_2NR^{12}R^{12}$; wherein $R^{10}$ and X are as defined above and each $R^{12}$ is selected from H and $R^{10}$; lower alkoxy; lower alkoxy substituted with hydroxy, cyano, lower alkanoyloxy, or lower alkoxy; phenoxy; or phenoxy substituted with one or more of lower alkyl, lower alkoxy or halogen;

$R^6$, $R^7$ and $R^8$ are each selected from hydrogen and lower alkyl; and $R^9$ is selected from $-OH$, $-Cl$, $-CONH_2$, $-CONH-$lower alkyl, lower alkoxy, phenoxy, $-SR^{11}$, and $-OXR^{10}$ wherein $R^{10}$ and $R^{14}$ are as defined above. The term "lower" as used herein means 1–6 carbons.

The couplers are prepared by procedures well known in the art and such couplers are disclosed in general in the patent literature, e.g., U.S. Pat. Nos. 2,805,218; 2,827,450; and 2,839,523.

The dyes of this invention can be applied to synthetic polyamide, polyester and cellulose acetate fibers according to known disperse dyeing techniques. Various dispersing and wetting agents can be employed in the dispersion of the finely divided dye compound in an essentially aqueous dyebath. Procedures by which the present dyes can be applied to polyamide textile materials are described, for example, in U.S. Pat. Nos. 3,100,134 and 3,320,021. Typically, the azo compound (16.7 mg.) is dispersed in 10 cc. of 2-methoxyethanol. A small amount (3–5 cc.) of a 3% sodium lignin sulfonate solution is added, with stirring, and the volume of the bath brought to 150 cc. with water. A 5 g. textile fabric made of nylon 66 fibers is placed in the bath and worked 10 minutes without heat. The bath is then slowly brought to the boil over a 30-minute period and the dyeing is carried out at the boil for one hour. The dyed fabric is then removed from the dyebath, rinsed with water and dried in an oven at 250° F. Fabric samples thus dyed with the present dyes exhibit one or more of the improved properties set forth above when tested in accordance with the procedures described, for example, in the Technical Manual of the American Association of Textile Chemists and Colorists, 1968 edition.

A typical general procedure by which polyester, e.g., poly(ethylene terephthalate) can be dyed with the present dyes is as follows. The dye cake is dispersed by heating and agitating a dyepot containing the dye cake and methyl cellosolve. When the dyecake has been ground free of lumps and dissolved as much as possible in the methyl cellosolve, 2% based on weight of the fabric of Igepon T-51 and 2.0% based on weight of the fabric of sodium lignin sulfonate from a premixed solution of the two components is added. Sufficient demineralized water is added to make about a 30:1 bath ratio of water to dye and a small amount of Versene 100 (sodium salt of ethylenediaminetetracetic acid) and Tanalon JDM-72 (dye carrier) are added. The pH of the dyebath is adjusted to about 5.0 with acetic acid. The fabric samples (wet-out) are entered into the dyepot and the entire contents thereof entered into a pressure dyeing container. The container is sealed and entered into a High Temperature Launder-Ometer which is heated to 120° F. and rotation thereof started. The temperature of the Launder-Ometer is raised to 265° F. at the rate of about 5° F. per minute, and maintained at this temperature for 1 hour. The Launder-Ometer is then cooled, and the fabric samples removed and scoured in demineralized water containing 1 g/l of neutral soap and 1 g/l sodium carbonate. The samples are rinsed in cold demineralized water and dried at 250° F. in a forced air oven.

The following table shows exemplary dyes of the present invention.

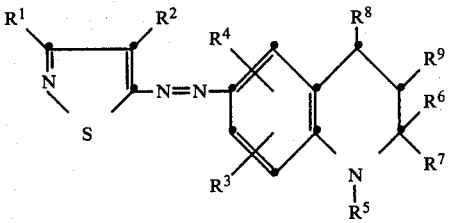

| Example | $R^1$ | $R^2$ | $R^3, R^4, R^6, R^7, R^8, R^9$ | $R^5$ |
|---|---|---|---|---|
| 1 | H | H | 2,7-di-$CH_3$ | $-CH_2CH(OH)CH_2OH$ |
| 2 | H | H | 2,5-di-$CH_3$—8-$OCH_3$ | $-CH_2CH(OH)CH_2OH$ |
| 3 | H | H | 2,2,4,7-tetra-$CH_3$ | $-C_2H_4CONH_2$ |
| 4 | H | H | 2,2,4-tri-$CH_3$ | $-C_2H_4NHCOCH_3$ |
| 5 | Cl | $OCH_3$ | 2-$CH_3$—7-$NHCOCH_3$ | $-C_2H_4CN$ |
| 6 | CN | H | 2,2,4-tri-$CH_3$—7-$NHCOCH_3$ | $-C_2H_4Cl$ |
| 7 | H | $COOC_2H_5$ | 2-$CH(CH_3)_2$—7-$NHCOCH_3$ | $-C_2H_4OOCH_3$ |
| 8 | $CH_3$ | $CONHC_2H_4OH$ | 7-$CH_3$ | $-C_2H_4OC_2H_5$ |
| 9 | $CH_3$ | Br | 3-CN—7-$CH_3$ | $-C_2H_4CONHC_2H_5$ |
| 10 | $CH_3$ | Br | 3-$CONH_2$—7-$CH_3$ | $-C_2H_4CONH(C_2H_5)_2$ |
| 11 | $CH_3$ | Br | 3-Cl—7-$CH_3$ | $-C_2H_4CONHCH_2C_6H_5$ |
| 12 | $CH_3$ | Br | 3-$OCH_3$—7-$CH_3$ | $-C_2H_4OOCOC_2H_5$ |
| 13 | $CH_3$ | Br | 2,2,4-di-$CH_3$—5,8-di-$OCH_3$ | $-C_2H_4NHCOCH=CH_2$ |
| 14 | $CH_3$ | Br | 2,2,4-tri-$CH_3$—8-$OCH_3$ | $-CH_2C_6H_5$ |
| 15 | $CH_3$ | Br | 2-$CH_3$—7-$NHCOCH_3$ | $-C_2H_4CONHCH_2OH$ |
| 16 | $CH_3$ | Br | 3-OH—7-$CH_3$ | $-C_3H_6NHCONHC_2H_5$ |
| 17 | $CH_3$ | Br | 2,7-di-$CH_3$ | $-C_2H_5$ |
| 18 | $CH_3$ | Br | 2,5-di-$CH_3$—8-$OCH_3$ | $-C_2H_4SO_2NH_2$ |
| 19 | $CH_3$ | CN | 2,2,4,7-tetra-$CH_3$ | $-C_2H_4SO_2NHC_2H_5$ |
| 20 | $CH_3$ | CN | 2,2,4-tri-$CH_3$ | $-C_2H_4SCH_3$ |
| 21 | $CH_3$ | CN | 2-$CH_3$—7-$NHCOCH_3$ | 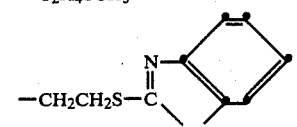 |
| 22 | $CH_3$ | CN | 2,2,4-tri-$CH_3$—7-$NHCOCH_3$ | 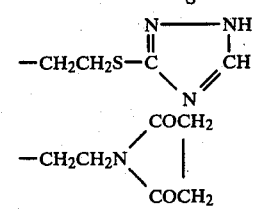 |
| 23 | $CH_3$ | CN | 2,-$CH(CH_3)_2$—7-$NHCOCH_3$ | 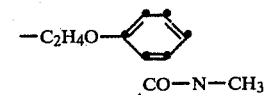 |
| 24 | $CH_3$ | CN | 7-$CH_3$ | 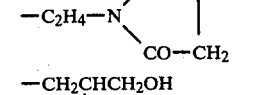 |
| 25 | $CH_3$ | CN | 3-CN—7-$CH_3$ | 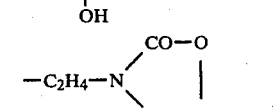 |
| 26 | $CH_3$ | CN | 3-$CONH_2$—7-$CH_3$ | $-CH_2CHCH_2OH$ <br> \| <br> OH |
| 27 | $CH_3$ | CN | 3-Cl—7-$CH_3$ | 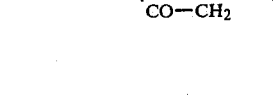 |

-continued

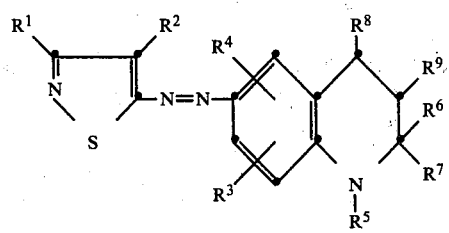

| Example | R¹ | R² | R³, R⁴, R⁶, R⁷, R⁸, R⁹ | R⁵ |
|---|---|---|---|---|
| 28 | CH₃ | CN | 3-OCH₃—7-CH₃ | −C₂H₄−N(CO−CH₂)(CO−CH₂)− |
| 29 | CH₃ | COOC₂H₅ | 2,2,4-di-CH₃—5,8-di-OCH₃ | −C₂H₄−N(COCH₂)(COCH₂)−CH₂ |
| 30 | CH₃ | COOC₂H₅ | 2,2,4-tri-CH₃—8-OCH₃ | −C₂H₄−N(CO)(CO)−C₆H₄ |
| 31 | CH₃ | COOC₂H₅ | 2-CH₃—7-NHCOCH₃ | −C₂H−N(CO−NH)(CO−CH₂)− |
| 32 | CH₃ | COOC₂H₅ | 3-OH—7-CH₃ | −C₂H₄−N(COCH₂)(COCH₂)−O |
| 33 | CH₃ | COOC₂H₅ | 2,7-di-CH₃ | −C₂H₄−N(CO)(SO₂)−C₆H₄ |
| 34 | CH₃ | COOC₂H₅ | 2,5-di-CH₃—8-OCH₃ | −C₂H₄−N(CO−S)(CO−CH₂)− |
| 35 | CH₃ | COOC₂H₅ | 2,2,4,7-tetra-CH₃ | −C₂H₄−S−C(=N−NC₂H₄CN)(N=CH)− |
| 36 | H | H | 2,2,4-tri-CH₃ | −C₂H₄−N(CO−CH₂)(CH₂−CH₂)− |
| 37 | H | H | 2-CH₃—7-NHCOCH₃ | −C₂H₄NHCO−C₆H₅ |
| 38 | H | H | 2,2,4-tri-CH₃—7-NHCOCH₃ | −C₂H₄NHCO−C₆H₄−OCH₃ |
| 39 | H | H | 2,-CH(CH₃)₂—7-NHCOCH₃ | −CH₂CH₂−S−C(=N−NH)(N=CH)− |
| 40 | CH₃ | Br | 7-CH₃ | −CH₂CH₂−N(CO)(CH₂)−C₆H₄ |
| 41 | CH₃ | Br | 3-CN—7-CH₃ | −C₂H₄OH |

-continued

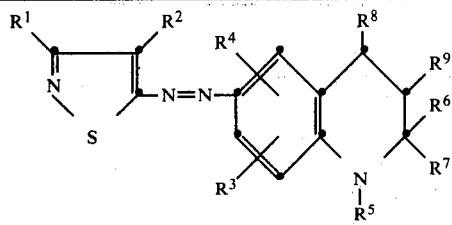

| Example | R¹ | R² | R³, R⁴, R⁶, R⁷, R⁸, R⁹ | R⁵ |
|---|---|---|---|---|
| 42 | $CH_3$ | Br | 3-$CONH_2$—7-$CH_3$ | ![structure: -CH₂CH₂-N bonded to cyclic CO-CH=CH-SO₂] |
| 43 | $CH_3$ | Br | 2,2,4,7-tetra-$CH_3$ | -$CH_2CH_2OCNH$-$C_6H_5$ (with C=O) |
| 44 | $CH_3$ | Br | 2,2,4,7-tetra-$CH_3$ | -$CH_2CH_2N$(phthalimido) |
| 45 | $CH_3$ | Br | 2,2,4,7-tetra-$CH_2$ | -$C_2H_4OH$ |
| 46 | $CH_3$ | Br | 2,2,4,7-tetra-$CH_3$ | -$C_3H_6NHCOCH_3$ |
| 47 | $CH_3$ | Br | 2,2,4,7-tetra-$CH_3$ | -$C_2H_4OCC_2H_4$-N(methylsuccinimido) |
| 48 | $CH_3$ | Br | 2,2,4-tri-$CH_3$—7-$NHCOCH_3$ | -$C_2H_4OC$-$C_6H_5$ (C=O) |
| 49 | $CH_3$ | Br | 2,2,4,7-tetra-$CH_3$ | -$C_2H_4OC$-$CH_2OC_6H_5$ (C=O) |
| 50 | $CH_3$ | Br | 2,7-di-$CH_3$ | -$C_2H_4SO_2NH_2$ |
| 51 | $CH_3$ | Br | 2,2,4,7-tetra-$CH_3$ | -$C_2H_4OCOCH_3$ |
| 52 | $CH_3$ | Br | 2,7-di-$CH_3$ | -$C_2H_4OH$ |
| 53 | $CH_3$ | Br | 2,2,4-tri-$CH_3$—7-$NHCOC_2H_5$ | -$C_2H_5$ |
| 54 | $CH_3$ | Br | 2,5-Di-$CH_3$—8-$OCH_3$ | -$C_2H_4OH$ |
| 55 | $CH_3$ | Br | 2-$CH_3$—8-$OCH_3$ | -$C_2H_4OH$ |
| 56 | $CH_3$ | CN | 2,7-di-$CH_3$ | -$C_2H_4SO_2NH_2$ |
| 57 | $CH_3$ | CN | 2,2,4-tri-$CH_3$—7-$NHCOC_2H_5$ | -$C_2H_5$ |
| 58 | $CH_3$ | CN | 2,4-di-$CH_3$—8-$OCH_3$ | -$C_2H_4OH$ |
| 59 | $CH_3$ | CN | 2,7-di-$CH_3$ | -$C_2H_4OH$ |
| 60 | $CH_3$ | CN | 2,2,4,7-tetra-$CH_3$ | -$C_2H_4OH$ |
| 61 | $CH_3$ | CN | 2,2,4,7-tetra-$CH_3$ | -$C_3H_6NHCOCH_3$ |
| 62 | $CH_3$ | CN | 2,2,4,7-tetra-$CH_3$ | -$C_2H_4OCCH_3$ (C=O) |
| 63 | $CH_3$ | CN | 2,2,4,7-tetra-$CH_3$ | -$C_2H_4CN$ |
| 64 | $CH_3$ | CN | 2,2,4,7-tetra-$CH_3$ | -$C_2H_4$-S-C(=N)-S-benzo |
| 65 | $CH_3$ | CN | 2,2,4,7-tetra-$CH_3$ | -$C_2H_4$-N(methylsuccinimido) |
| 66 | $CH_3$ | CN | 2,2,4,7-tetra-$CH_3$ | -$C_2H_4CONH_2$ |
| 67 | $CH_3$ | $CO_2C_2H_5$ | 2,7-di-$CH_3$ | -$C_2H_4OH$ |
| 68 | $CH_3$ | $CO_2C_2H_5$ | 2,7-di-$CH_3$ | -$C_2H_4OCOCH_3$ |
| 69 | $CH_3$ | $CO_2C_2H_5$ | 2,2,4,7-tetra-$CH_3$ | -$C_2H_4OH$ |
| 70 | $CH_3$ | $CO_2C_2H_5$ | 2,2,4,7-tetra-$CH_3$ | -$C_2H_4OCOCH_3$ |

-continued

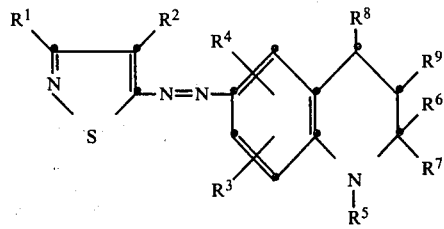

| Example | R¹ | R² | R³, R⁴, R⁶, R⁷, R⁸, R⁹ | R⁵ |
|---|---|---|---|---|
| 71 | $CH_3$ | $CO_2C_2H_5$ | 2,2,4,7-tetra-$CH_3$ | —$C_3H_6NHCOCH_3$ |
| 72 | $CH_3$ | $CO_2C_2H_5$ | 2,2,4-tri-$CH_3$—7-$NHCOCH_3$ | —$C_2H_5$ |
| 73 | $CH_3$ | $CO_2C_2H_5$ | 2,2,4-tri-$CH_3$—7-$NHCOCH_3$ | —$C_2H_4CN$ |
| 74 | $CH_3$ | $CO_2C_2H_5$ | 2,2,4-tri-$CH_3$—7-$NHCOCH_3$ | —$C_2H_4OH$ |
| 75 | $CH_3$ | $CO_2C_2H_5$ | 2,2,4-tri-$CH_3$—7-$NHCOCH_3$ | —$C_2H_4OCOCH_3$ |
| 76 | $CH_3$ | $CO_2C_2H_5$ | 2,2,4-tri-$CH_3$—7-$NHCOCH_3$ | —$C_2H_4OCOCH_3$ |
| 77 | $CH_3$ | $CONHC_2H_4OH$ | 2,7-di-$CH_3$ | —$C_2H_4SO_2NH_2$ |

The invention has been described in detail with particular reference to preferred embodiments thereof, but it will be understood that variations and modifications can be effected within the spirit and scope of the invention.

We claim:

1. A compound of the formula

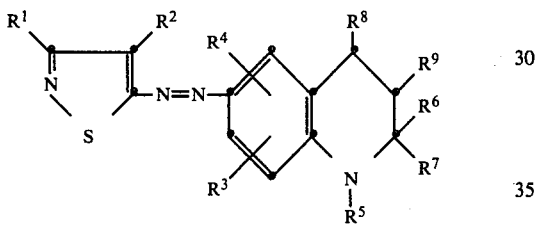

wherein
R¹ and R² are each selected from cyano, bromo, chloro, formyl, lower alkoxycarbonyl, lower alkyl, lower alkylsulfonyl, thiocyanato, carbamoyl, lower alkylcarbamoyl, hydroxy substituted lower alkylcarbamoyl, and lower alkanoyl;

R³ and R⁴ are each selected from hydrogen, fluorine, chlorine, bromine, lower alkyl, cycloalkyl, lower alkoxy, phenoxy, lower alkylthio, arylthio, and radicals having the formula —NH—X—R¹⁰ in which X is —CO—, —COO—, or —SO₂ and R¹⁰ is selected from lower alkyl and lower alkyl substituted with halogen, hydroxy, phenoxy, aryl, cyano, cycloalkyl, lower alkylsulfonyl, lower alkylthio, lower alkanoyloxy, or lower alkoxy, and when X is —CO—, R¹⁰ also can be hydrogen, amino, lower alkylamino, lower dialkylamino, arylamino, aryl, or furyl;

R⁵ is selected from hydrogen; cycloalkyl; cycloalkyl substituted with one or two groups selected from lower alkyl, —OH, lower alkoxy, halogen and hydroxy substituted lower alkyl; phenyl; phenyl substituted with lower alkyl, lower alkoxy, halogen, lower alkanoylamino, cyano or lower alkoxycarbonyl; straight or branched lower alkenyl; straight or branched alkyl of 1–8 carbons; and straight or branched alkyl of 1–8 carbons substituted with the following: hydroxy; halogen; cyano; succinimido; glutarimido; phthalimido; 2-pyrrolidono; cyclohexyl; phenyl; phenyl substituted with lower alkyl, lower alkoxy, halogen, lower alkanoylamino, cyano or lower alkoxycarbonyl; lower alkanoylamino; vinylsulfonyl; acrylamido; phthalimidinyl; benzoylsulfonicimidyl; lower alkylsulfonamido; phenylsulfonamido; lower alkoxycarbonylamino; lower alkylcarbamoyloxy; lower alkoxycarbonyl; lower alkoxycarbonyloxy; groups of the formula

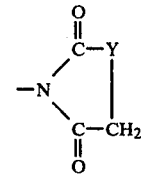

wherein Y is —NH—, —NH—lower alkylene, —O—, —S—, or —CH₂O—; —S—R¹¹ wherein R¹¹ is lower alkyl, phenyl, phenyl substituted with halogen, lower alkyl, lower alkoxy, lower alkanoylamino, cyano, or lower alkoxycarbonyl, pyridyl, pyrimidinyl, benzoxazolyl, benzimidazolyl, benzothiazolyl, or

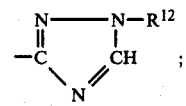

—$OXR^{10}$; —NH—X—$R^{10}$; —X—$R^{10}$; —$CONR^{12}R^{12}$; —$SO_2NR^{12}R^{12}$; wherein R¹⁰ and X are as defined as above and each R¹² is selected from H and R¹⁰; lower alkoxy; lower alkoxy substituted with hydroxy, cyano, lower alkanoyloxy, or lower alkoxy; phenoxy; or phenoxy substituted with one or more of lower alkyl, lower alkoxy or halogen;

R⁶, R⁷, and R⁸ are each selected from hydrogen and lower alkyl; and R⁹ is selected from H, —OH, —Cl, —$CONH_2$, —CONH—lower alkyl, lower alkoxy, phenoxy, —$SR^{11}$, and —$OXR^{10}$ wherein R¹⁰ and R¹¹ are as defined above.

2. A compound according to claim 1 having the formula

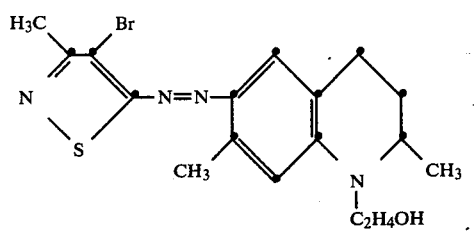
3. A compound according to claim 1 having the formula
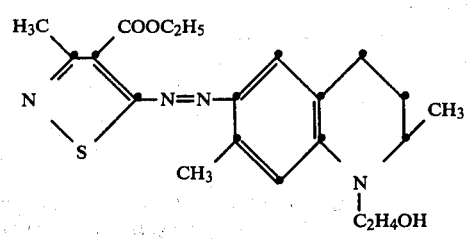
4. A compound according to claim 1 having the formula
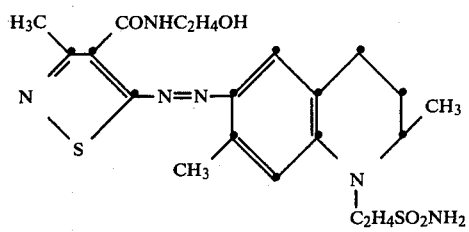
5. A compound according to claim 1 having the formula
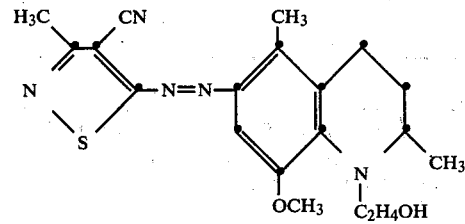
* * * * *